US007058428B2

(12) United States Patent
Yamaki et al.

(10) Patent No.: US 7,058,428 B2
(45) Date of Patent: Jun. 6, 2006

(54) PORTABLE PHONE EQUIPPED WITH COMPOSING FUNCTION

(75) Inventors: Kiyoshi Yamaki, Toyoda-cho (JP); Ichiro Futohashi, Hamakita (JP)

(73) Assignee: Yamaha Corporation, Hamamatsu (JP)

( * ) Notice: Subject to any disclaimer, the term of this patent is extended or adjusted under 35 U.S.C. 154(b) by 445 days.

(21) Appl. No.: 10/204,366

(22) PCT Filed: Jan. 29, 2001

(86) PCT No.: PCT/JP01/00587

§ 371 (c)(1),
(2), (4) Date: Aug. 20, 2002

(87) PCT Pub. No.: WO01/61682

PCT Pub. Date: Aug. 23, 2001

(65) Prior Publication Data

US 2003/0013497 A1 Jan. 16, 2003

(30) Foreign Application Priority Data

Feb. 21, 2000 (JP) ...................................... 2000-043157

(51) Int. Cl.
*H04M 1/00* (2006.01)

(52) U.S. Cl. ..................... 455/567; 455/418; 455/412.2

(58) Field of Classification Search .............. 455/412.1, 455/412.2, 413, 414.1, 414.4, 417, 418, 550.1, 455/567; 370/467, 469

See application file for complete search history.

(56) References Cited

U.S. PATENT DOCUMENTS 5,393,927 A 2/1995 Aoki
5,492,049 A 2/1996 Aoki et al.
6,094,587 A * 7/2000 Armanto et al. ............ 455/567
6,421,353 B1 * 7/2002 Kim ........................... 370/465

FOREIGN PATENT DOCUMENTS

JP 09-230857 9/1997
JP 09-327052 * 12/1997
JP 10-150505 6/1998
JP 10-173737 6/1998
JP 11-355393 12/1999

OTHER PUBLICATIONS

Office Action, issued on Sep. 2, 2003, by Japan Patent Office.

Office Action, issued on Jan. 12, 2005, by Korean Patent Office.

Office Action, issued on Dec. 3, 2004, by China Patent Office.

* cited by examiner

*Primary Examiner*—Doris H. To
*Assistant Examiner*—Sanh Phu
(74) *Attorney, Agent, or Firm*—Pillsbury Winthrop Shaw Pittman LLP

(57) ABSTRACT

A portable telephone apparatus has a communication unit for receiving a call signal to inform a user of an arrival of a call so that the user can start a talk, and a reproduction unit for processing music data in response to the call signal to reproduce a piece of music composed of two or more parts including a melody part and an accompaniment part so as to audibly notify the user of the arrival of the call. Allowing the user to compose music without need for an excessive amount of work, score data for a melody is inputted first (IN1), and style information and chord information are inputted in the process of creating an accompaniment part. Then, accompaniment data for drum, bass and chord parts are selected from a ROM 12 or RAM 11 based on the inputted style and chord information (SE1). The selected accompaniment data of two or more parts are merged with the score data of the melody (PR1) to create music data. The created music data is stored in an original music data area of the RAM 11, and reproduced at the time of arrival of a call.

22 Claims, 9 Drawing Sheets

(a)

(b)

(c)

PORTABLE PHONE EQUIPPED WITH COMPOSING FUNCTION

This application is a 371 of PCT/JP01/00587 filed on Jan. 29, 2001.

FIELD OF THE INVENTION

The present invention relates to a portable telephone apparatus having a capability of composing music.

BACKGROUND ART

In portable telephone systems such as PDC (Personal Digital Cellular Telecommunication System) known as analog or digital cellular systems, or PHS (Personal Handy-Phone System), a portable telephone set carried by a user rings to alert the user at the time of arrival of a call. Conventionally, the alert is made by beeping sound, but it has recently replaced by a melody tone because the beeping sound is a noise offensive to the ear.

The above-mentioned type of portable telephone set that sounds a ringing melody pre-stores music data representing two or more ringing melodies, so that the user can select a desired ringing melody. The user may also access a service center from the portable telephone terminal set to download music data for desired ringing melodies from the service center. Further, some users have desired to create music data for use as their original ringing melodies, so some portable telephones have recently offered the users the capability of creating music data for ringing melodies.

Now, most recently developed portable telephones are provided with music reproduction means capable of reproducing music data composed of two or more parts. In this case, a ringing melody may be formed of music tones in two or more of a melody part and accompaniment parts. If the melody is derived from one melody part and three accompaniment parts, which are composed of a bass part and two chord parts, the music data will be data in four parts. Creating music data in four parts, however, requires the user to input data four times as much as those for the melody part alone, which results in an enormous amount of work. In addition, creating accompaniment data needs some knowledge of musical theory, so only a small percentage of the users can create music data in two or more parts.

It is therefore an object of the present invention to provide a portable telephone apparatus with composition capability that allows anyone to create music data for ringing melodies without the need for the enormous amount of work.

DISCLOSURE OF THE INVENTION

In attaining the above object and according to the first aspect of the invention, there is provided a portable telephone apparatus with composition capability, comprising a communication means for receiving a call signal to inform a user of an arrival of a call so that the user can start a talk, a reproduction means for processing music data in response to the call signal to reproduce a piece of music composed of two or more parts including a melody part and an accompaniment part so as to audibly notify the user of the arrival of the call, a storage means in which accompaniment data representative of two or more different kinds of accompaniment parts are stored, an input means for inputting score data representative of a desired melody part and storing the inputted score data into the storage means while inputting style information for specifying a style of an accompaniment part to be combined with the melody part, a composition means for selecting, from the storage means, accompaniment data representative of the accompaniment part fitting to the melody part based on the input style information, then merging the selected accompaniment data with the score data stored in the storage means to create music data representative of a composed piece of music in two or more parts, and storing the created music data into the storage means, and a control means for reading out the music data stored in the storage means in response to the call signal and feeding the read music data to the reproduction means so that the composed piece of music can be reproduced. The input means inputs, in addition to the style information, chord information for specifying a progression of chords in the accompaniment part to be combined with the melody part. The composition means selects, from the storage means, accompaniment data representative of the accompaniment part fitting to the melody part based on the inputted style information and the chord information, and merges the selected accompaniment data with the score data stored in the storage means.

Preferably, the storage means is capable of storing preset accompaniment data and accompaniment data downloaded through the communication means, and the composition means is capable of selecting, from among all the accompaniment data including the preset accompaniment data and the downloaded accompaniment data, accompaniment data representative of the accompaniment part fitting to the melody part.

Preferably, the storage means is capable of storing preset music data, music data downloaded through the communication means, and music data created by the composition means. The input means is capable of specifying a piece of music to be reproduced in response to the call signal. The control means is capable of reading out music data corresponding to the specified piece of music from among all the music data including the preset music data stored in the storage means, the downloaded music data, and the composed music data, and then feeds the read music data to the reproduction means.

In attaining the above object and according to the second aspect of the invention, there is provided a portable telephone apparatus with composition capability, comprising a communication means for receiving a call signal to inform a user of an arrival of a call so that the user can start a talk, a reproduction means for processing music data in response to the call signal so as to reproduce a piece of music composed of two or more parts including a melody part and an accompaniment part so as to audibly notify the user of the arrival of the call, a storage means in which accompaniment data representative of two or more different kinds of accompaniment parts are stored, an input means for inputting score data representative of a desired melody part and storing the inputted score data into the storage means while inputting music mood information for specifying a music mood of an accompaniment part to be combined with the melody part, a composition means for analyzing the score data and operating based on the music mood information for selecting, from the storage means, accompaniment data representative of the accompaniment part fitting to the melody part, then merging the selected accompaniment data with the score data stored in the storage means to create music data representative of a composed piece of music in two or more parts, and storing the created music data into the storage means, and a control means for reading out the music data stored in the storage means in response to the call signal and for feeding the read music data to the reproduction means so that the composed piece of music can be reproduced.

Preferably, the storage means is capable of storing preset accompaniment data and accompaniment data downloaded through the communication means, and the composition means is capable of selecting, from among all the accompaniment data including the preset accompaniment data and the downloaded accompaniment data, accompaniment data representative of the accompaniment part fitting to the melody part.

Preferably, the storage means is capable of storing preset music data, music data downloaded through the communication means, and music data created by the composition means. The input means is capable of specifying a piece of music to be reproduced in response to the call signal. The control means is capable of reading out music data corresponding to the specified piece of music from among all the music data including the preset music data stored in the storage means, the downloaded music data and the composed data, and feeding the read music data to the reproduction means.

According to the first aspect of the invention, the portable telephone apparatus selects the accompaniment data fitting to the melody part based on the inputted score data for the melody part and the inputted style information, or based on the style information and the chord information. This allows the user to create the accompaniment data without manual input operations, and hence to create music data composed of two or more parts with a small amount of work. Further, since the user has only to input the style information and the chord information to create the accompaniment data in the composition process, the user can create music data in two or more parts without any special knowledge of musical theory.

According to the second aspect of the invention, the portable telephone apparatus selects the accompaniment data fitting to the melody part based on the inputted score data for the melody part and the inputted music mood information. This allows the user to create the accompaniment data without manual input operations, and hence to create music data composed of two or more parts with a small amount of work. Further, since the user has only to input the music mood information to create the accompaniment data in the composition process, the user can create music data in two or more parts without any special knowledge of musical theory.

BEST MODES FOR CARRYING OUT THE INVENTION

Figure 1:
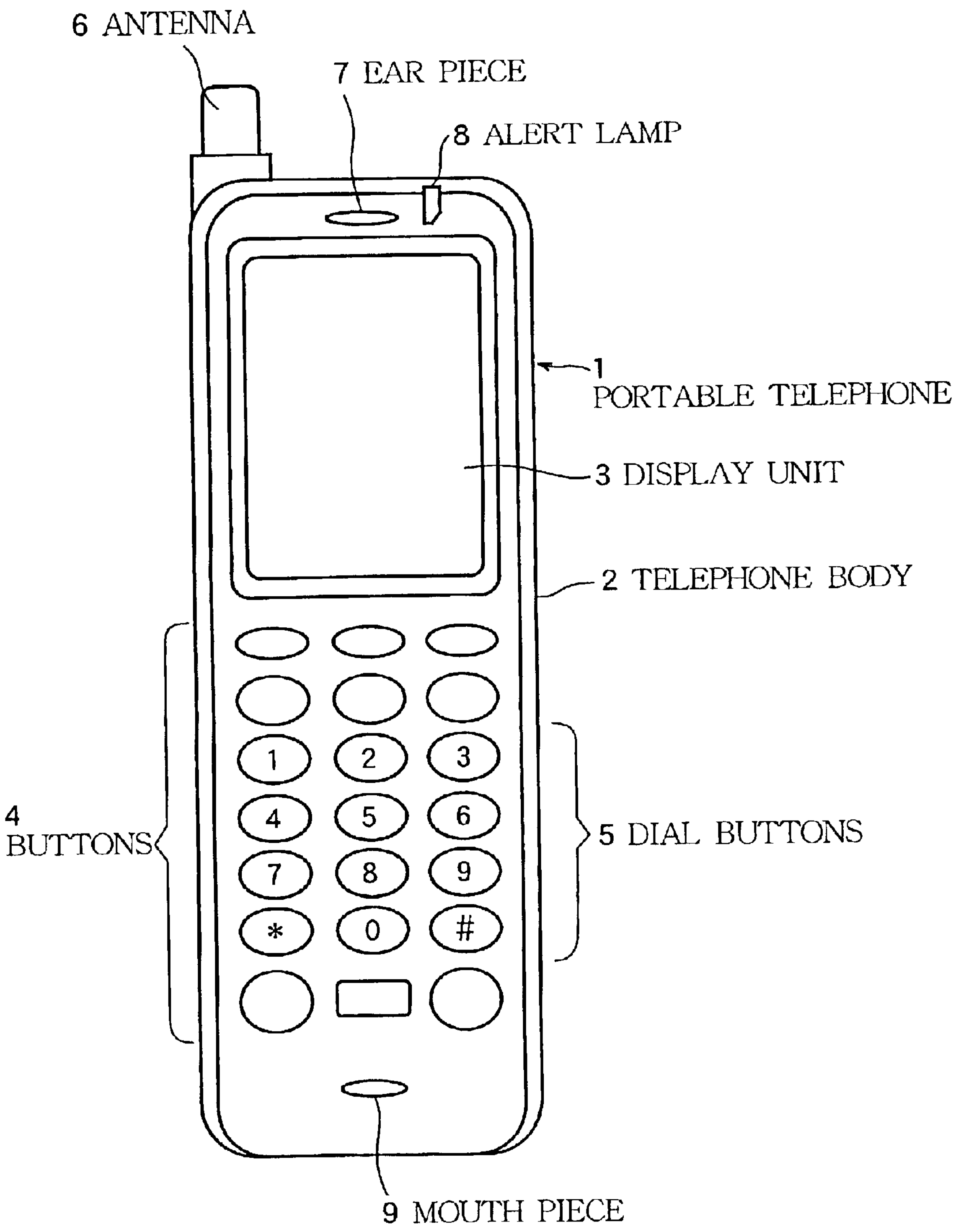
FIG. 1 is an illustration showing the appearance of a portable telephone set with composition capability according to the invention.

The following describes a portable telephone apparatus with composition capability according to an embodiment of the present invention. FIG. 1 shows the appearance of a configuration of the portable telephone apparatus according to the embodiment of the invention. As shown, the portable telephone 1 is generally constituted of a telephone body 2 with a display unit 3, various buttons 4, etc., and a telescopic antenna 6. Inside the telephone body 2 is a hardware mounted for implementing telephone capabilities, music reproduction means, music data composition means, and the like. Displayed on the display unit 3 are menu screens in the composition process, a telephone number entered at the time of placing a call, caller's telephone number at the time of arrival of a call, etc.

The various buttons 4 are provided below the display unit 3 on the telephone body 2, including dial buttons 5 each of which is assigned one of digits '0' to '9'. This arrangement allows a user to operate the various buttons 4 while viewing the display screen on the display unit 3 when the user composes music data, or inputs a telephone number and the like.

The antenna 6 is telescopically provided on the upper side of the telephone body 2. The antenna 6 is housed in the telephone body 2 during standby to get the convenience of portability, while it is unfolded or extended during telephone talking to improve the gain of the antenna. Provided above the display unit 3 is an ear piece 7 from which partner's voice is outputted during talking, and on the lower side of the telephone body 2 is a mouth piece 9 to which a voice is inputted. Also provided on the upper side of the telephone body 2 is an alert lamp 8 for use in informing the user of the arrival of a call.

Figure 2:
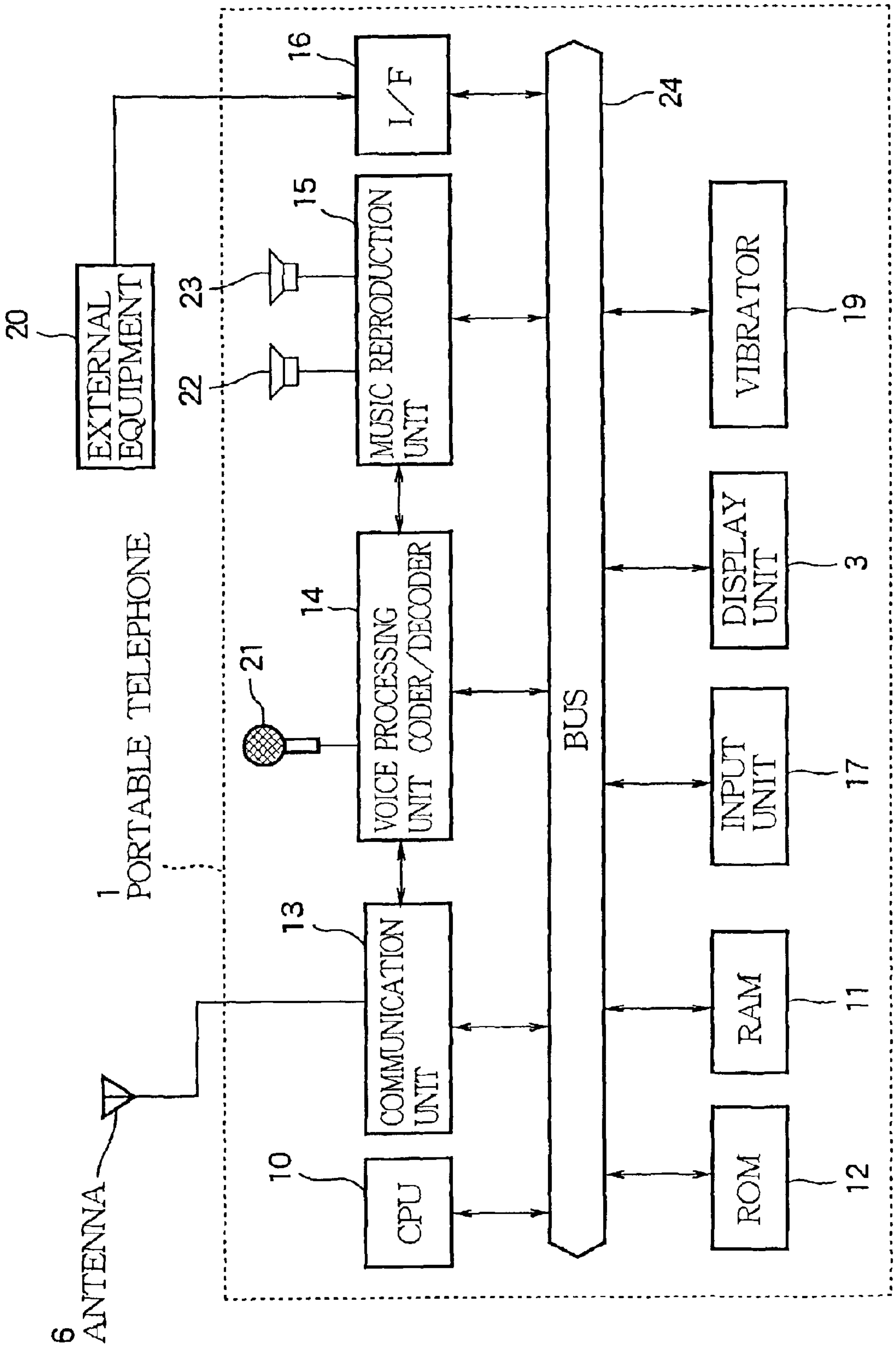
FIG. 2 is a block diagram showing a hardware configuration of the portable telephone set with composition capability according to an embodiment of the invention.

FIG. 2 is a block diagram showing a hardware configuration of the portable telephone 1 mounted inside the telephone body 2. As shown, the antenna 6 incorporated in the portable telephone 1 is connected to a communication unit 13 having modulation and demodulation capabilities. A central processing unit (CPU) 10 is a control unit that executes a program for telephone capabilities to control operation of each unit of the portable telephone 1. The CPU 10 is equipped with a timer that indicates the amount of elapsed time in operation, and generates timer interrupts at certain intervals. The CPU 10 also executes another program that supports music reproduction processing, and a composition program that creates music data composed of two or more parts. A RAM 11 is a random access memory that provides a work area for the CPU 10, a storage area for downloaded music data and accompaniment data, an original music data storage area for storing composed music data made of two or more parts, etc. A ROM 12 is a read only memory for storing the program for various telephone capabilities, such as to control the transmission and reception of a call, executed by the CPU 10, the reproduction program that supports the music reproduction processing, the composition program that creates music data in two or more parts, and various kinds of data such as preset music data and preset accompaniment data.

The Communication unit 13 demodulates a signal received at the antenna 6, and modulates a signal to be transmitted and supplies the modulated signal to the antenna 6. The reception signal demodulated at the communication unit 13 is decoded at a voice processing unit (coder/decoder) 14, while the transmission signal inputted from a microphone 21 is compressed and coded at the voice processing unit 14. The voice processing unit 14 codes and decodes the transmission voice with high efficiency compression, for example, using coder/decoder of CELP (Code Excited LPC) or ADPCM (Adaptive Differential PCM coding) type. The music reproduction unit 15 outputs the reception signal from the voice processing unit 14 to sound the voice from an ear-piece speaker 22, while the unit 15 reproduces selected music data to output a music tone as a ringing or holding tone. It should be noted that the ringing tone is sounded from an alert speaker 23, and the holding tone is mixed with the reception signal and sounded from the ear-piece speaker 22. The tone sounded from the ear-piece speaker 22 is sent out from the ear-piece 7 of the telephone body 2.

If there occurs a certain amount of free space in a score data storage means provided inside the body while the music reproduction unit 15 is reproducing the music data, the music reproduction unit 15 sends an interrupt signal to the CPU 10, and the CPU 10, in turn, reads out the continued sections of music data to transfer the same to the music reproduction unit 15. An interface (I/F) 16 is provided for inputting music data and accompaniment data from an external equipment 20. An input unit 17 is inputted means for detecting input from the various buttons 4 including the dial buttons ‘0’ to ‘9’ provided on the telephone body 2. The display unit 3 is a display such as a crystal liquid display, on which an image such as menus for telephone or composition capabilities is produced at the push of some of the various buttons such as the dial buttons 5. A vibrator 19 vibrates the telephone body 2 at the time of arrival of a call, instead of the ringing tone, to inform the user of the arrival of the call. It should be noted that each functional block sends and receives data and instructions through a bus 24.

Figure 3:
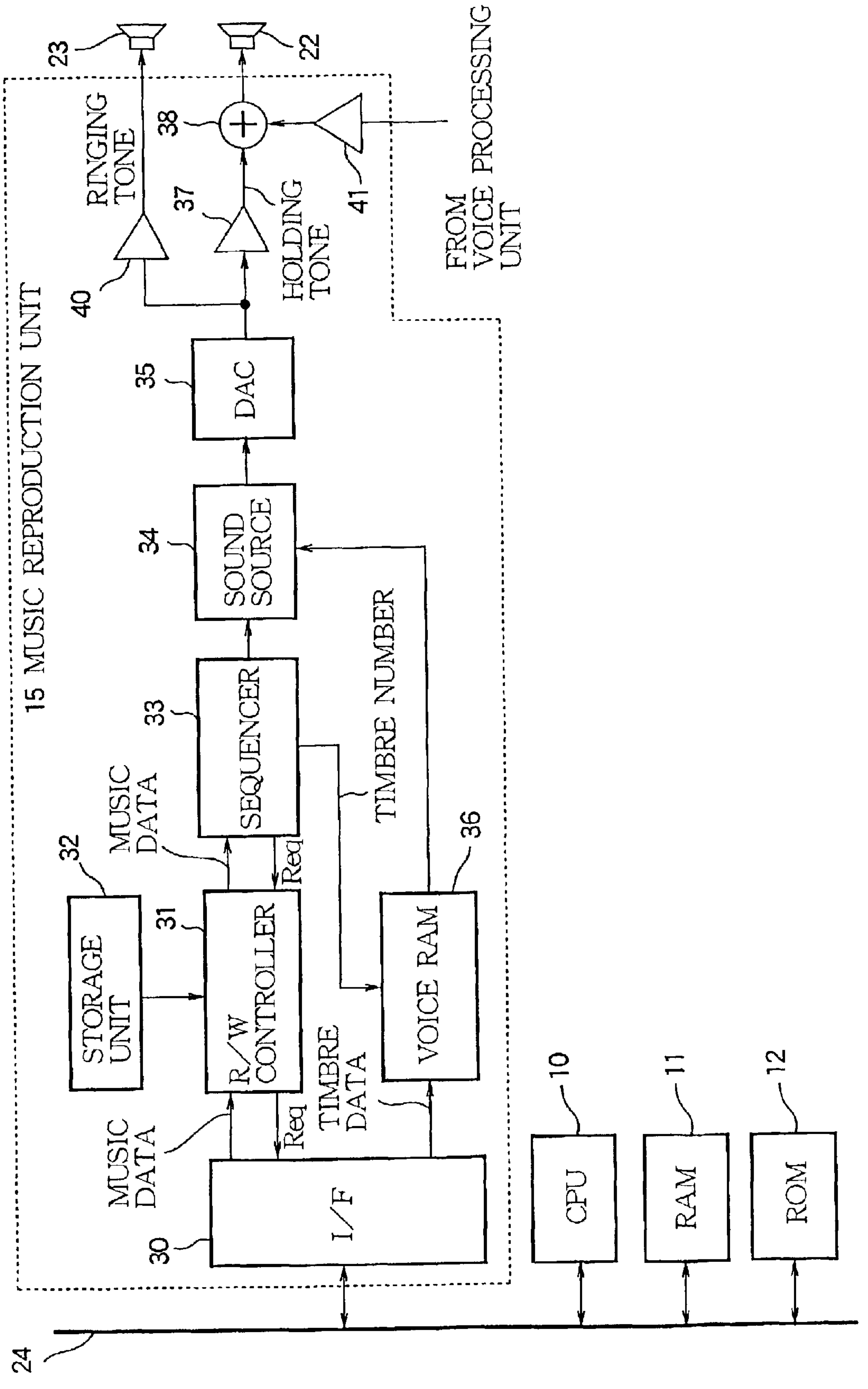
FIG. 3 is a diagram showing a configuration of a music reproduction unit of the portable telephone set with composition capability according to the embodiment of the invention.

FIG. 3 shows a configuration of the music reproduction unit shown in FIG. 2. In the music reproduction unit shown here, an interface (I/F) 30 is an interface that sends and receives various data through the bus 24. During music data initialization, all the music data but timbre data are stored in a free space of a music data storage 32 under the control of a read/write controller (R/W controller) 31. Timbre data in contained the music data is supplied to and stored in a timbre data storage (Voice RAM) 36. The timbre data storage (Voice RAM) 36 is a storage means for storing timbre data supplied from the interface 30; it has eight timbres of maximum storage capacity, for example. A sequencer 33 analyzes music data during initialization, applies to the timbre data storage (Voice RAM) 36 a timbre number for each part, and reads out a timbre parameter corresponding to the timbre number from the timbre data storage (Voice RAM) 36 to set the read timbre data for a sound source 34.

When music reproduction is started to sound a melody at the time of arrival of a call, the R/W controller 31 receives a read request signal (Req) from the sequencer 33 to read out music data consecutively from the music data storage 32, and supplies them to the sequencer 33. The storage capacity of the music data storage 32 is set smaller than the capacity enough to store whole music data for one piece of music. For example, the capacity is set to 32-word of the music data. The sequencer 33 receives consecutive word of the music data from the R/W controller 31, and analyzes each word of music data to set the sound source 34 with a sound source parameter corresponding to the music data so that each word of the music data will be sounded at the sound timing analyzed. The sound source parameters include pitch data, note on/off signal, etc.

The sound source 34 is capable of sounding a collection of tone signals in four parts at the same time, for example. The timbre of each tone signal is set to the one read outfrom the timbre data storage (Voice RAM) 36 to produce a tone signal according to the set timbre and based on the sound source parameter set by the sequencer 33. The tone signals produced with a maximum of four tones are then supplied to a digital/analog converter (DAC) 35 at certain reproduction timing, and converted to analog tone signals. The four parts consist of a melody part, a bass part, and two chord parts, for example.

If there occurs a certain amount of free space in the music data storage 32 during the reading of the music data from the music data storage 32, the R/W controller 31 sends out a transfer request signal (Req) to the bus 24 through the interface 30. Upon receipt of the transfer request signal (Req), the CPU 10 reads out a certain amount of music data corresponding to the free space, for example, 16 words of music data from a RAM 11 and the like, and sends out the read music data to the bus 24. The music data is transferred through the interface 30, and is written into the free space of the music data storage 32 under the control of the R/W controller 31. This operation is so repeated that the whole music piece can be reproduced even if the music data storage 32 has a less storage capacity than the capacity enough to store the whole music data for one piece of music.

When the tone signals reproduced are sounded as a ringing melody, an amplifier 40 is activated to sound them from the alert speaker 23. On the other hand, when the tone signals are sounded as a holding tone, an amplifier 37 is activated to output the holding tone from the ear piece speaker 22 through the ear piece 7 after passing through a mixer 38. If the tone signals are sounded as a holding tone, an amplifier 41 is so deactivated that the reception signal decoded in the voice processing unit 14 can never be output.

It should be noted that, since the timbre allocation data for each part are inserted in the music data, the timbre in each part can be arbitrary changed during the reproduction. Further, the user can select eight timbres of timbre data from all the timbre data stored in the RAM 11 to set timbres in the timbre data storage (Voice RAM) 36. If the RAM 11 has various kinds of timbre data that have been downloaded, any timbre data can be selected from among a variety of timbre data, and stored in the timbre data storage (Voice RAM) 36.

For the music to be reproduced as the ringing tone, any one of the following music data is selectable: preset music data preset in the ROM 12; downloaded music data downloaded from a service center by the user accessing the service center, and stored in the RAM 11; and original music data created and stored in the RAM 11 by the user performing composition processing, as described below, for music data in two or more parts.

Figure 4:
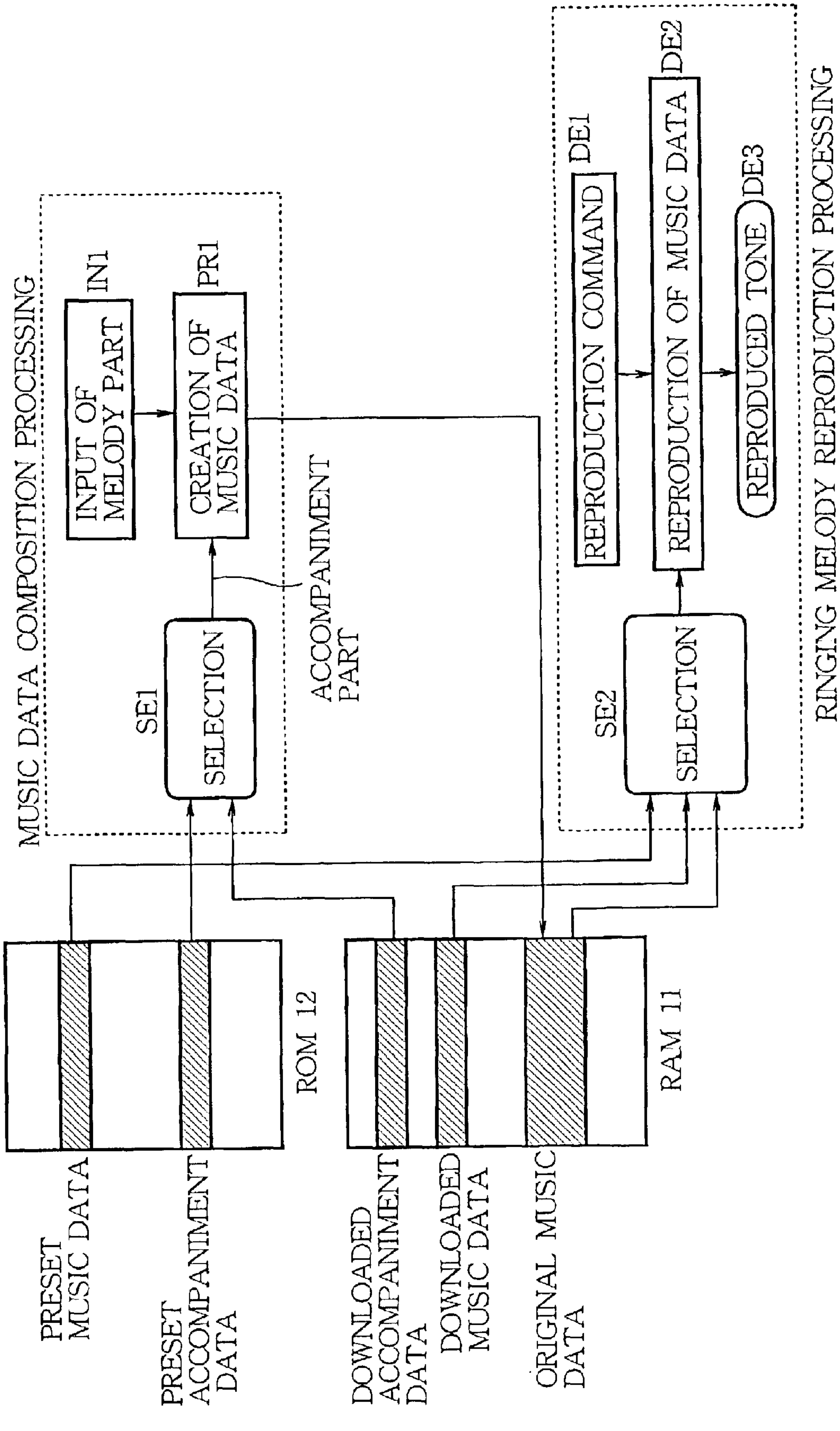
FIG. 4 is a diagram for explaining music data composition processing executed by the portable telephone set with composition capability according to the embodiment of the invention.

Referring to FIG. 4, the following is a brief description of music data composition processing when the user composes original music on the portable telephone with composition capability according to the present invention. FIG. 4 shows the outline of the music data composition processing and ringing melody reproduction processing implemented in the hardware shown in FIG. 2. The music data composition processing is activated by operating the various buttons 4 on the input unit 17 to select "COMPOSITION" from a ringing melody menu on the display 3. In the music data composition processing routine, the various buttons 4 are so operated that score data for the melody part are inputted first. In this case, the sol-fa, that is, tone names 'do', 're', 'mi', . . . are assigned to the dial buttons 5, for example, so that the user can operate the dial buttons 5 to input music score data for the melody part. The input of score data may be represented as the tone names on the display unit 3, or as notes on music paper. The input of the score data for the melody part is shown in FIG. 4 as melody part input processing IN1.

After completion of the input of the score data for the melody part, accompaniment part creation processing is performed. In the accompaniment part creation processing routine, the user selects a style fitting to the inputted melody part from among various styles appearing on the display unit 3, such as 'POPS', 'ROCK', 'R&B', etc. The user can select a desired style by listening to an accompaniment pattern of standard rhythm for each style. Then, variation patterns of the selected style are displayed on the display unit 3 so that the user can select a variation pattern fitting to the inputted melody part. In this selection step, the user can also select a desired variation pattern by listening to the rhythm of each variation pattern. The accompaniment pattern data thus selected in the accompaniment part creation processing are derived from among accompaniment data preset in a preset accompaniment data area of the ROM 12 and accompaniment data downloaded to the portable telephone 1 and stored in a downloaded accompaniment area of the RAM 11. That is, when the user listens to each accompaniment pattern, a standard rhythm pattern is read out and reproduced by the music reproduction unit 15.

Then, the user selects chords fitting to the input melody part from a chord menu. In this selection step, either the number of bars or the section like 'Introduction', 'Main' or 'Fill-in' can be selected as a unit of sounding the chords, so the chords can be selected in the span of the several bars or the section. Based on the chords selected in this step and the style selected in the previous step, accompaniment data for the bass and chord parts in the accompaniment parts are thus selected from the accompaniment data stored in the ROM 12 and RAM 11. At the same time, accompaniment data for the drum part including percussion of the accompaniment part are selected from the accompaniment data stored in the ROM 12 and RAM 11 based on the selected style. The length of the accompaniment data selected corresponds to the length of sounding the chords.

If the number of bars are selected as a unit of sounding the chords and the number is specified, then chords for the next number of bars are specified. Accompaniment data for the bass and chord parts of the accompaniment parts are then selected from the accompaniment data stored in the ROM 12 and RAM 11 based on the chords thus selected and the style previously selected. At the same time, accompaniment data for drum part including percussion of the accompaniment parts are selected from the accompaniment data stored in the ROM 12 and RAM 11 based on the selected style. The above-mentioned operations are repeated until the accompaniment data for the bass, chord and drum parts are selected for all the bars.

If the section is selected as a unit of sounding the chords, then the next section is selected and chords are selected for the section. Accompaniment data for the bass and chord parts of the accompaniment parts of the next section are then selected from the accompaniment data stored in the ROM 12 and RAM 11 based on the chords thus selected and the style previously selected. At the same time, accompaniment data for a drum part including percussion in the accompaniment parts of the next section are selected from the accompaniment data stored in the ROM 12 and RAM 11 based on the selected style. The above-mentioned operations are repeated until the accompaniment data for the bass, chord and drum parts are selected for all the sections. The accompaniment data having two or more parts fitting to the input melody part are thus created.

The accompaniment pattern data selected in the above-mentioned accompaniment part creation processing can be selected from among accompaniment data preset in the preset accompaniment data area of the ROM 12 and accompaniment data downloaded to the portable telephone 1 and stored in the downloaded accompaniment area of the RAM 11. The selection of the accompaniment data for creation of the accompaniment parts is shown in FIG. 4 as selection processing SE1. It should be noted that the style may be selected by specifying a tempo, or the style and chords may be selected by specifying timbres for the drum, bass or chord parts.

After the completion of the melody part input processing and the accompaniment part selection processing, the score data inputted as the melody part, and the accompaniment data for the accompaniment parts composed of the drum, bass and chord parts are then merged by music data creation processing PR1 into music data in two or more parts. The music data in two or more parts thus composed are stored in an original music data area of the RAM 11.

It should be noted that the data structure of the accompaniment parts may vary according to the number of simultaneously sounded tones that are available from the sound source 34 in the music reproduction unit 15, or with the application of the music data. Suppose that the number of parts across which the sound source 34 can sound tones simultaneously is four. In this case, since the melody part is essential and at least two chord parts are necessary, the remaining one part is assigned to either the bass or drum part. For the accompaniment part that has no sound part assigned, it is preferable that the creation processing is automatically skipped in the accompaniment part creation processing so that the accompaniment part can never be created.

Then, when a call arrives at the portable telephone 1, the ringing-melody reproduction processing is activated, and reproduction command processing DE1 is so performed that a command to start reproduction of music data is outputted. Upon receipt of the command, the music reproduction unit 15 executes music data reproduction processing DE2 to start reproduction of music data. The music data to be reproduced at this point has already been selected in selection processing SE2. In selection processing SE2, the user selects "MUSIC SELECTION" from the ringing melody menu to select music data. For the music data to be reproduced, any one of the following music data is selectable: music data preset in a preset music data area of the ROM 12; music data downloaded to the portable telephone 1 and stored in a downloaded music data area of the RAM 11; and music data composed by the user and stored in the original music data area. The selection of music can be made at any time, and after the selection, the music data selected as the ringing tone is reproduced by the music reproduction unit 15 and sounded at the time of arrival of a call. It should be noted that reproduction of desired music data that the user could select may also be performed for audition purposes.

Figure 5:
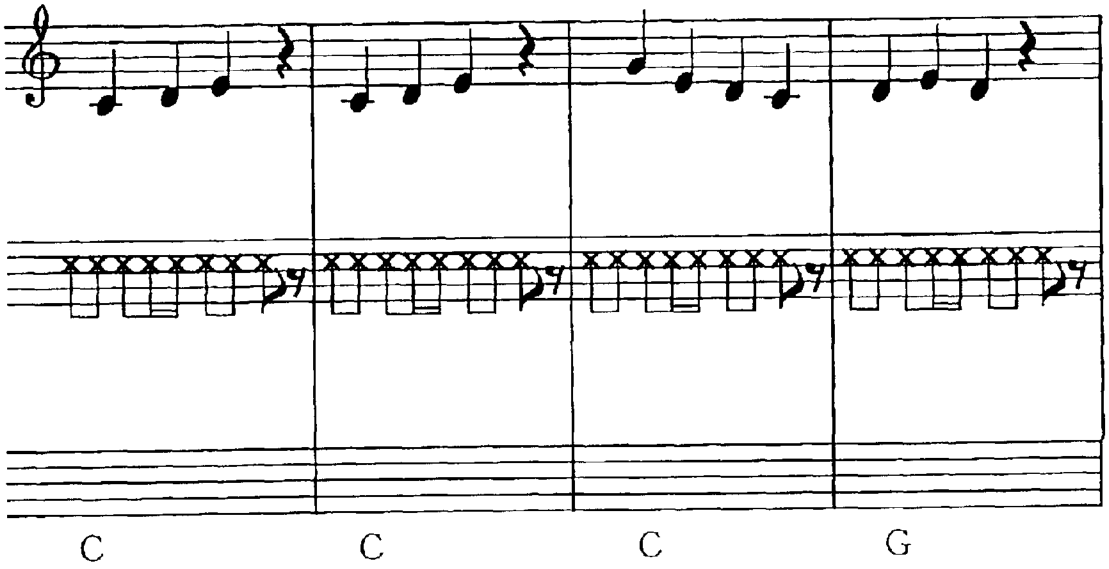
FIG. 5 is an illustration showing an example of music data composed by the portable telephone set with composition capability according to the invention.

Upon execution of the above-mentioned music data composition processing, music data in the form of a score as shown in FIG. 5 may be composed. The score shown in FIG. 5 includes a melody part in the top stave, a drum part in the middle stave, and a chord part In the bottom stave, that is, the music data in the score consist of the melody part, the drum part and the chord part. If two parts are assigned for the chord part, four parts are enough in number to be simultaneously sounded. That is, if the sound source 34 in the music reproduction unit 15 is capable of sounding four parts or more at the same time, the music data shown in FIG. 5 can be reproduced.

Figure 6:
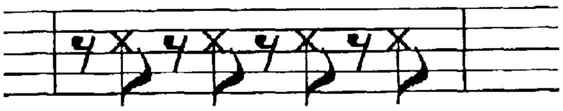
FIG. 6 is an illustration showing examples of accompaniment data for a drum part selectable in the composition process by the portable telephone set with composition capability according to the invention.
Figure 6:
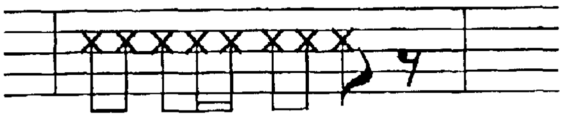
Figure 6:
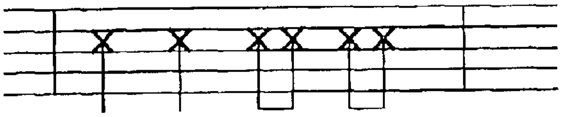

Suppose further that, when accompaniment data for the drum part is selected and created, the drum part has three variation patterns stored in the preset accompaniment data area of the ROM 12 and the downloaded accompaniment data area of the RAM 11. FIG. 6 shows these three examples of variation patterns as (a), (b) and (c). Of all the variation patterns, the one shown in FIG. 6(*b*) is selected to compose the music data shown in FIG. 5.

Figure 7:
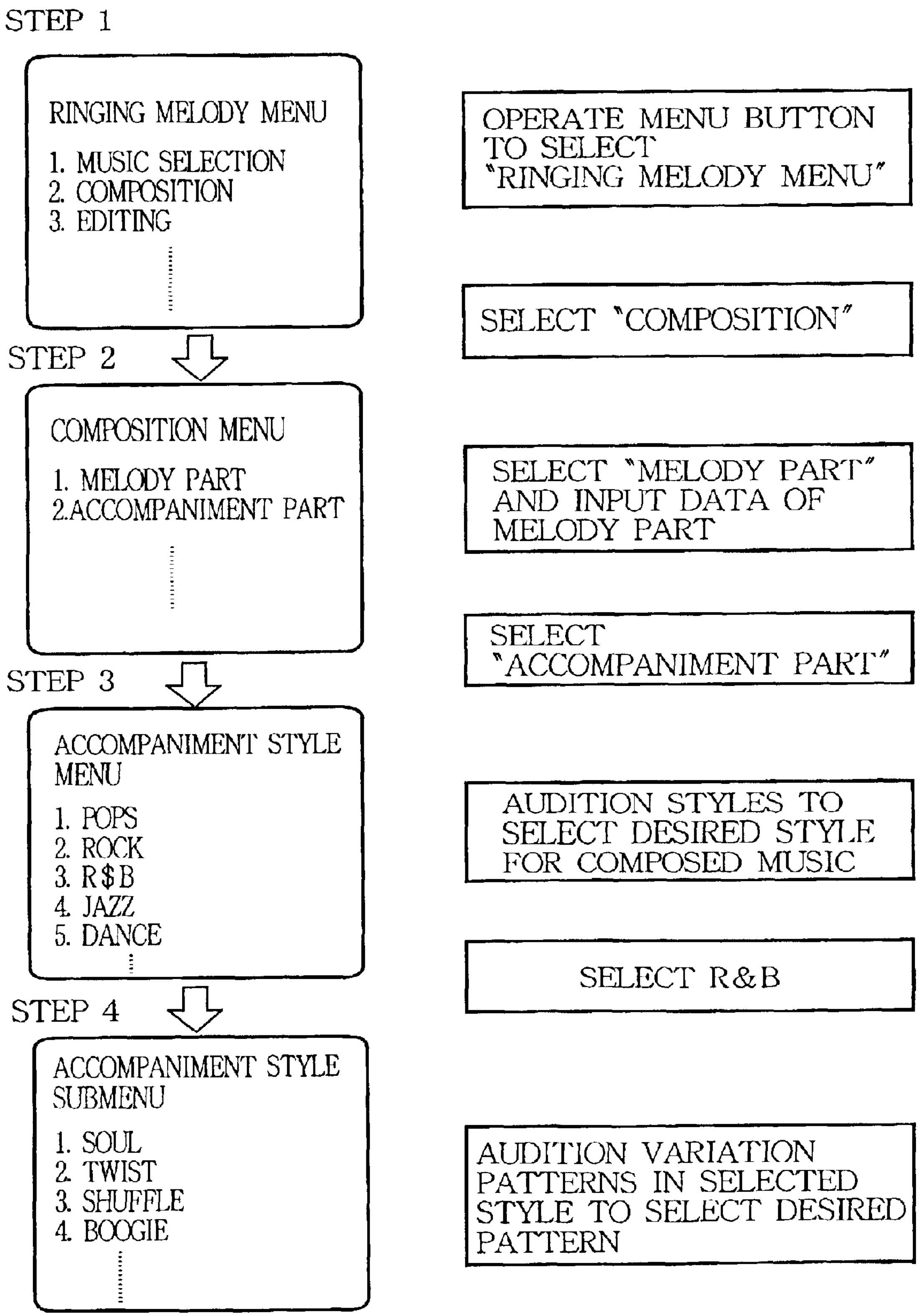
FIG. 7 is a diagram showing menus appearing on a display unit in the composition process by the portable telephone set with composition capability according to the invention.
Figure 8:
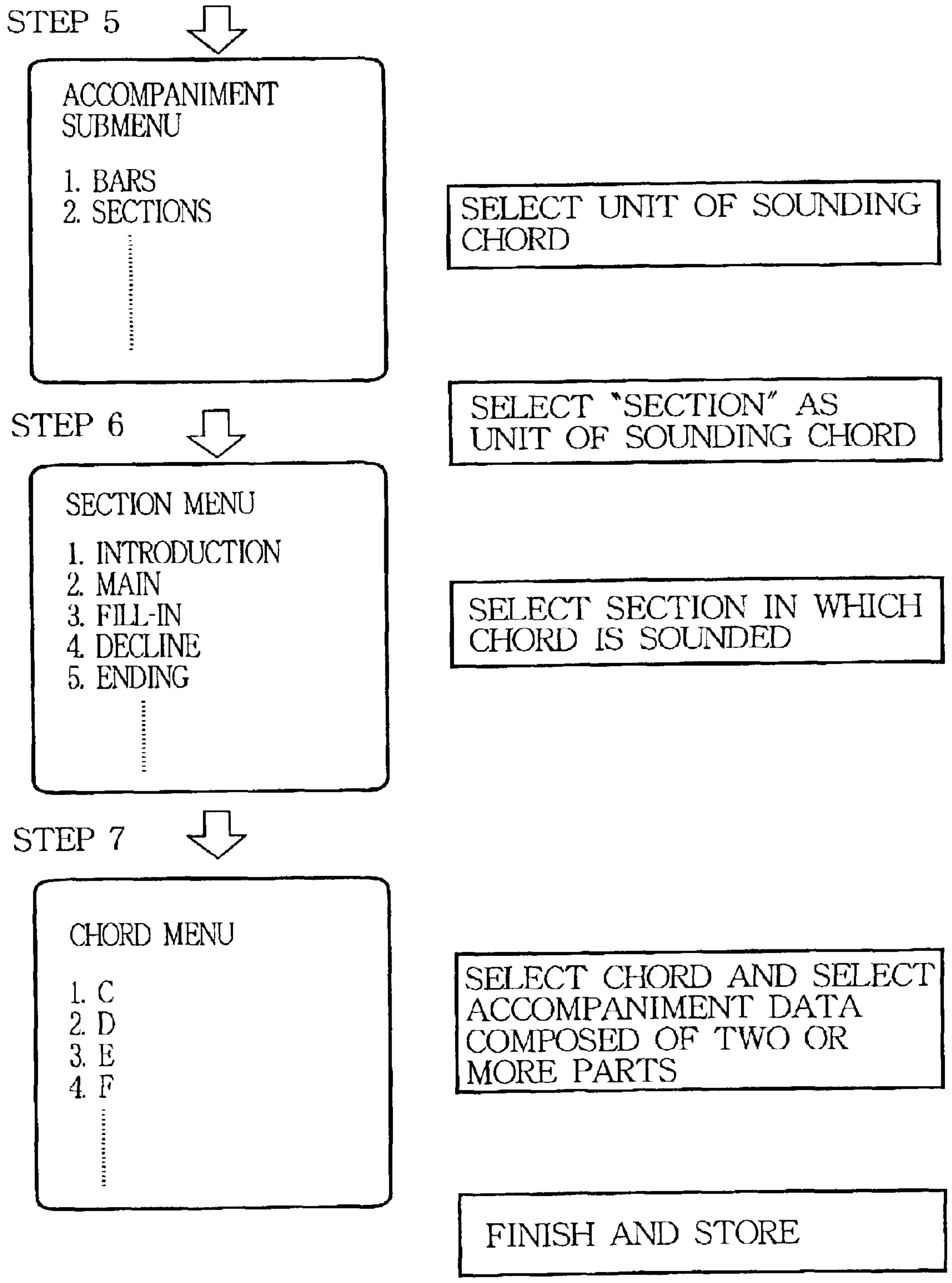
FIG. 8 is a diagram showing other menus appearing on the display unit in the composition process by the portable telephone set with composition capability according to the invention.

Referring to display screens on the display unit 3 as shown in FIGS. 7 and 8, the following describes composition procedures when the user composes music on the portable telephone set with composition capability according to the present invention. At first, the user operates the various buttons 4 on the input unit 17 to select "RINGING MELODY" from various kinds of menus so that the display screen of the "RINGING MELODY" menu will appear on the display unit 3 as shown in step 1 of FIG. 7. The ringing melody menu includes a music selection menu for reproducing music data to be reproduced at the time of arrival of a call, a composition menu that allows the user to compose any music, an editing menu for editing music data, etc. Since music is to be composed this time, the user pushes dial '2' in the dial buttons 5 to select the composition menu from the ringing melody menu. As a result, the music data composition processing is activated and the composition menu shown in step 2 of FIG. 7 appears on the display unit 3.

The composition menu displays a screen that lets the user select either the melody part or the accompaniment part as being composed. Since the accompaniment part is to be created after creation of the melody part, the user pushes dial '1' in the dial buttons 5 to select the melody part. Then there appears a display screen, not shown, which lets the user input desired score data for the melody part by operating the dial buttons 5 and the like. In this case, sol-fa syllables, that is, tone names 'do', 're', 'mi', . . . are assigned to the dial buttons 5, for example, so that the user can operate the dial buttons 5 assigned respective tone names to input score data for the melody part. The score data input may be represented as the tone names on the display unit 3, or as notes on music paper. The timbre of the melody part is also selected and inputted. Thus, the user operates the dial buttons 5 one after another to input the score data for the melody part. Upon completion of the input of the score data for the melody part, the score data for the melody part, for example, as shown in the top stave of the score in FIG. 5, are completed. After the completion of the input of the score data for the melody part, the processing procedure returns to the composition menu, and the user pushes dial '2' in the dial buttons 5 to select the accompaniment part for creation of accompaniment data in two or more parts.

After the accompaniment part item is selected, an accompaniment style menu appears as shown in step 3 of FIG. 7. The accompaniment style menu displays on the display unit 3 a screen that lets the user select a style from among various styles such as 'POPS', 'ROCK', 'R&B', etc. If the user wants to select a style fitting to the melody part, the user can listen to an accompaniment pattern of standard rhythm in each style for the purpose of selecting a desired one. For example, when operating '#', '1' and other necessary dial buttons 5, the user can listen to an accompaniment pattern of 'POPS' rhythm for a certain length of time. The length of time may be defined in terms of the bars, or another length may be adopted as a standard. Accompaniment rhythm patterns are generally stored by the several bars in the preset accompaniment data area of the ROM 12 and the downloaded accompaniment area of the RAM 11. Therefore, the accompaniment pattern data can be read out and supplied to the music reproduction unit 15 to reproduce a bar of accompaniment rhythm pattern. The accompaniment pattern can also be looped up so that two or more bars of accompaniment rhythm pattern will be reproduced.

After listening to the accompaniment rhythm pattern, if the user pushes dial '3' in the dial buttons 5, 'R&B' is selected for the style. As a result, an accompaniment style submenu shown in step 4 of FIG. 7 appears on the display unit 3. The accompaniment style submenu displays on the display unit 3 a screen that lets the user select a variation pattern from among plural variation patterns in the style 'R&B', such as 'SOUL', 'TWIST', 'SHUFFLE', 'BOOGIE', etc. Then the user selects a variation pattern fitting to the inputted melody part. In this selection step, the user can also listen to the rhythm of each variation pattern to select a desired variation pattern with the same operation as that mentioned above. The accompaniment pattern data thus selected in the accompaniment part creation processing can be selected from among accompaniment data preset by the bar in the preset accompaniment data area of the ROM 12 and accompaniment data downloaded to the portable telephone 1 and stored in the downloaded accompaniment area of the RAM 11. Here, if the user selects and operates one of the dial buttons 5, to which a numerical value indicative of a desired variation pattern is assigned, accompaniment data for the drum part in the accompaniment parts, for example, as shown in the middle stave of the score in FIG. 5, are created during creation of the accompaniment parts. It should be noted that the style may be selected by inputting tempo information or selecting the name of instrument (timbre) used for the drum part.

After completion of the selection from the accompaniment style submenu, an accompaniment submenu shown in step 5 of FIG. 8 appears on the display unit 3. Here, the user selects chords fitting to the inputted melody part from the accompaniment submenu. At first, the user selects either the number of bars, or the section such as 'Introduction', 'Main' or 'Fill-in', as a unit of sounding the chords. If the user pushes dial '2' in the dial buttons 5 to select the section as a unit of sounding the chords, a section menu shown in step 6 of FIG. 8 appears on the display unit 3. The section menu displays on the display unit 3 a screen that lets the user select any one of the sections 'Introduction', 'Main', 'Fill-in', 'Decline' and 'Ending'. Here, if the user pushes dial '2' in the dial buttons 5, the main section is selected. Then a chord menu shown in step 7 of FIG. 8 appears on the display unit, which allows the user to select chords in the main section selected.

The chord menu displays on the display unit 3 a screen that lets the user select appropriate ones of the chords 'C', 'D', 'E' 'F', . . . 'B'. For example, the push of dial '1' in the dial buttons 5 inputs C chord, the push of dials '0' and '1' inputs chord Cm, the push of dials '*', '0' and '1' inputs chord C#. In this case, dials '0' and '*' can be combined with dials '2' to '7' to input similar variations in the chords 'D' to 'B'.

When necessary chords are selected, the chord part indicative of the progression of chords and the bass part are created along the main section based on the chords thus selected and the style selected from the above-mentioned accompaniment style submenu. At the same time, accompaniment data for the drum part including percussion are created based on the style selected. To be more specific, the accompaniment data for the drum part, the bass part and the chord part created based on the selected style or chords are selected from among the accompaniment data stored in the ROM 12 AND RAM 11. The accompaniment data selected in the accompaniment data creation processing for the drum part, the bass part and the chord part can be selected from among the accompaniment data preset in the preset accompaniment data area of the ROM 12 and the accompaniment data downloaded to the portable telephone 1 and stored in the downloaded accompaniment data area of the RAM 11. It should be noted that timbres in the bass part and the chord part may also be specified during the chord selection.

After the accompaniment data corresponding to the main section is selected and created, the processing procedure returns to the section menu shown in step 6 of FIG. 8, which allows the user to select a next section. If the user selects the next section, the chord menu shown in step 7 of FIG. 8 appears again so that the user can select chords in the next section. Then, accompaniment data for the drum part, the bass part and the chord part are selected along the next section based on the selected style or chords from among the accompaniment data stored in the ROM 12 and RAM 11. These operations are repeated until accompaniment data in all the sections are created.

After the completion of the input of the melody part and the creation of the accompaniment parts, the user operates an end button defined beforehand. Thus, the score data inputted as the melody part, and the selected accompaniment data of the accompaniment parts including the drum part, the bass part and the chord part, are merged into music data composed of plural part. The music data in two or more part and composed such above are stored in the original music data area of the RAM 11.

Returning to step 1 of FIG. 7, if the music selection menu is selected, a list, not shown, of music data stored in the preset music data area, the downloaded music data area, and the original music data area appears so that the user can select any one of the music data. During selection, the user can also listen to any music data that the user could select.

In step 1 of FIG. 7, if an editing menu is selected, the editing menu similar to the composition menu appears so that the user can edit the selected melody part or accompaniment parts. In this case, if the melody part is selected, the user can reenter data in a certain part of the score. If the accompaniment parts are selected, the user can change the style or chords. After editing, selections are made over again for the drum part, the bass part and the chord part, which in turn are merged again into music data after edited. The edited music data are written over the previous one, or newly registered in the original music data area, in accordance with user's instructions.

Further, in the accompaniment submenu of step 5, the user may push dial '1' in the dial buttons 5 to select the number of bars as a unit of sounding chords. In this case, a menu, not shown, which lets the user input and specify the number of bars, appears on the display unit 3. Here, when the user operates one of dial buttons 5 to input the number of bars, the processing procedure shifts to the chord menu of step 7. The remainder of processing is the same as that for the section. It should be noted that, although the above description has assumed the section or the number of bars to be the unit of sounding the chords, the number of beats may be specified as the unit.

Figure 9:
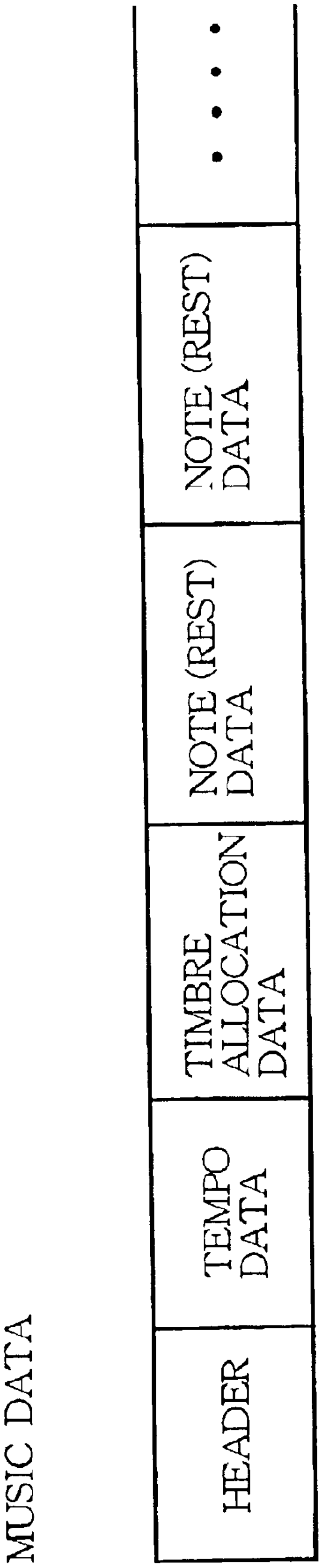
FIG. 9 is a diagram showing the structure of music data created by the portable telephone set with composition capability according to the invention.

FIG. 9 shows an example of the structure of the music data stored in the preset music data area of the ROM 12, the downloaded music data area of the RAM 11, and the original music data area. As shown, the lead of the music data is a header, and the following is tempo data for specifying a temp to be reproduced. The tempo data can be specified during composition. The tempo data are followed by timbre allocation data that set timbres for the melody part, the drum part, the bass part and the chord part, respectively. Behind the timbre allocation data are note data and rest data for a piece of music. For example, each of the note data and the rest data is set in bars, the number of which is the maximum the sound source 34 is able to sound simultaneously. That is, these data are not independent of each other on a part basis, and are queued in sounded order.

Upon reproduction of music data stored in the preset music data area of the ROM 12, the downloaded music data area of the RAM 11, or the original music data area, timbre data necessary for the reproduction are also read out from a timbre data area of the ROM 12 or the RAM 11, and supplied to the music reproduction unit 15 as a part of the music data. The timbre data specify eight timbres at the most, containing a waveform parameter, an envelop parameter, a modulation parameter, an effect parameter, and other parameters. Each parameter is unique to each timbre. These timbre data are stored in the timbre data storage (Voice RAM) 36 in the initialization processing executed each time the music data are reproduced.

Figure 10:
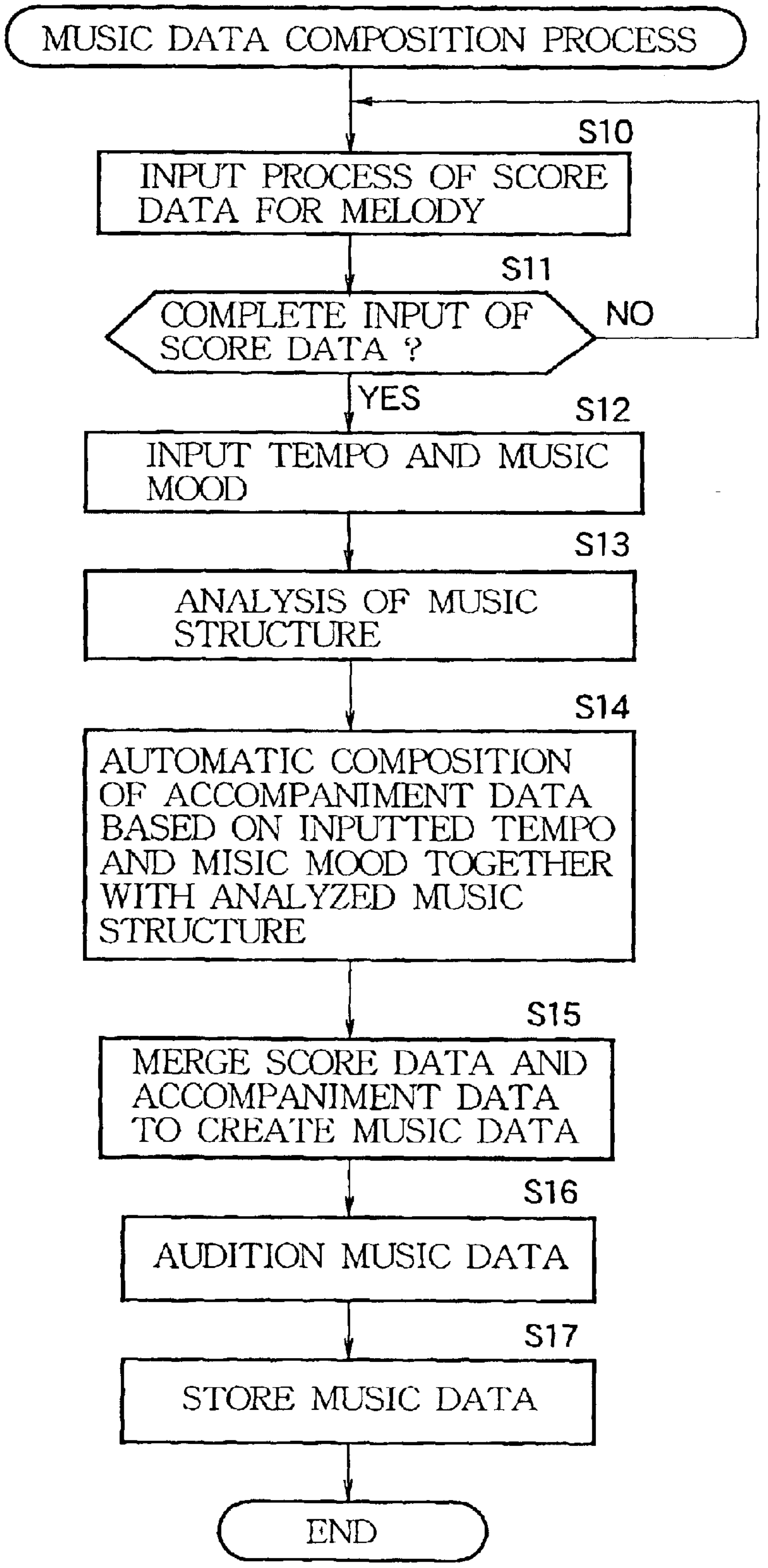
FIG. 10 is a flowchart showing the music data composition processing executed by the portable telephone set with composition capability according to another embodiment of the invention.

Referring to the flowchart of FIG. 10, the following describes a portable telephone set with composition capability according to the second embodiment of the invention. The portable telephone according to the second embodiment is designed to automatically analyze score data for the melody part to create accompaniment data each time the score data are inputted. The configuration is the same as that of the portable telephone 1 shown in FIGS. 1 through 3. According to the second embodiment, when the user operates the various buttons 4 to start the music data composition processing to compose music, the music data composition processing is activated. In this processing, there first appear on the display unit 3 instructions that let the user input score data for the melody part. In accordance with these instructions, the user operates the dial buttons 5 to input score data for the melody (step S10) in the same manner as in the first embodiment. The input of the score data continues until it is judged in step S11 that the input of the score data has been completed. After completion of the input of the score data, the user pushes a certain button 4 to indicate that the user has finished inputting the score data. The push of the certain button 4 brings about the judgment in step S11 that the input of the score data has been completed, so the processing procedure advances to step S12.

In step S12, there appears on the display unit 3 a display that lets the user input tempo and music mood information. Here, the user operates the dial buttons 5 to input a tempo. For the music mood information or feeling information, the user selects a desired key from among displayed options 'Upbeat Pops', 'Old Jazz', 'Jazz-flavored', 'Simply', 'thrillingly', etc. Namely, the music mood information is a key indicating or characterizing sensational or emotional aspects of the music piece. The music mood information is inputted in terms of words or phrases representing artistic impression of the music piece. After input of the tempo and music mood information, the processing procedure advances to step S13 to perform a music structure analysis of the score data for the melody inputted in step S10. As disclosed in Japanese patent application laid-open publication No. 9-230857 to the same applicant, the music structure analysis processing is performed as follows: first, the music structure of the score data for the melody is analyzed to divide the score data into two or more sections according to the flow of scenes or motif, and then, the up degree of each of the divided sections numerically representing an emotional upsurge of the music is calculated.

In the subsequent step S14, an accompaniment pattern is selected from among those stored in the ROM 12 and RAM 11 based on the input tempo, the music mood information and the calculated up degree, and is assigned to each section. Thus, accompaniment data fitting to the score data for the melody are automatically created. In this case, the accompaniment data can be composed of the drum part, the bass part and the chord part. Then, in step S15, the accompaniment data automatically created is merged with the score data for the melody to form music data as shown in FIG. 9. Here, the user can check the created music data by reproducing and auditioning the music piece in step S16, and may store the music data in the original music data area of the RAM 11 in step S17.

If the user feels that the music data needs to be edited after listing to the same in step S16, the user may return to step S12, and repeat step S12 and the steps following step S12 so that the user can edit the music data. On the other hand, if the result in step S14 shows that there are two or more accompaniment patterns to be assigned, all the accompaniment data may be presented to the user to leave the selection to the user's discretion.

The accompaniment pattern can be selected from among the accompaniment patterns preset and stored in the preset accompaniment data area of the ROM 12 and the accompaniment patterns downloaded to the portable telephone 1 and stored in the downloaded accompaniment data area of the RAM 11.

The music data composition processing according to the first embodiment as described in FIGS. 7 and 8, and the music data composition processing according to the second embodiment may be both provided in the portable telephone set with composition capability according to the present invention. In this case, the user is required to select either of the music data composition processing modes at the time of starting music data composition processing.

As described above, the composition capability provided in the portable telephone according to the present invention is implemented via software, and a music data composition processing program is stored in the ROM 12. Alternatively, the program may be installed from the external equipment 20 into the RAM 11. If installed from the external equipment 20, the music data composition processing program can easily be updated. The external equipment 20 may be a removable disk drive such as a CD-ROM, MO, or HDD drive.

The above-mentioned sound source 34 contained in the music reproduction unit 15 may be a frequency-modulated FM sound source. The FM sound source uses frequency-modulated higher harmonics to generate music, which makes it easy to generate a waveform having higher harmonic components including anharmonic tones. The FM sound source is provided with oscillators called operators, which oscillate to produce equivalent sine waves. Thus, the FM sound source is made up of first and second operators connected in series. The FM sound source may also be made of an operator, the output of which is fed back to its own input.

Further, the sound source 34 contained in the music reproduction unit 15 is not limited to the FM sound source, and another sound source, for example, of a waveform memory (PCM sound source) or physical model type can be used. Furthermore, the sound source may be a hardware sound source using a DSP or the like as its structural element, or a software sound source on which a sound source program is executed.

INDUSTRIAL APPLICABILITY

According to the first aspect of the invention, the accompaniment data fitting to the melody part is selected based on the inputted score data for the melody part and the inputted style information, or the style information and the inputted chord information. This allows the user to create the accompaniment data without manual input operations, and hence to create music data composed of two or more parts with a small amount of work. Further, since the user has only to input the style information and the chord information to create the accompaniment data in the composition process, the user can create music data composed of plural parts without any special knowledge of musical theory.

According to the second aspect of the invention, the accompaniment data fitting to the melody part are selected based on the inputted score data for the melody part and the selected music mood information. This allows the user to create the accompaniment data without manual input operations, and hence to create music data in two or more parts with a small amount of work. Further, since the user has only to input the music mood information to create the accompaniment data in the composition process, the user can create music data in two or more parts without any special knowledge of musical theory.

What is claimed is:

1. A portable telephone apparatus having a composition capability, comprising:

a communication means for receiving a call signal to inform a user of an arrival of a call so that the user can start a conversation;

a reproduction means for processing music data in response to the call signal to reproduce a piece of music composed of two or more parts including a melody part and an accompaniment part so as to audibly notify the user of the arrival of the call;

a storage means in which accompaniment data representative of two or more different kinds of accompaniment parts are stored, wherein said storage means stores preset accompaniment data and accompaniment data downloaded through said communication means;

an input means for inputting score data representative of a desired melody part and for storing the inputted score data into said storage means while inputting style information for specifying a style of an accompaniment part to be combined with the melody part;

a composition means for selecting, from said storage means, accompaniment data representative of an accompaniment part fitting to the melody part based on the inputted style information, merging the selected accompaniment data with the score data stored in said storage means to create music data representative of a composed piece of music in two or more parts, and storing the created music data into said storage means, wherein said composition means selects, from among all the accompaniment data including the preset accompaniment data and the downloaded accompaniment data, accompaniment data representative of the accompaniment part fitting to the melody part; and a control means for reading the music data stored in said storage means in response to the call signal to provide the read music data to said reproduction means so that the composed piece of music can be reproduced.

2. A portable telephone apparatus according to claim 1 wherein said input means inputs, in addition to the style information, inputs chord information for specifying a progression of chords in the accompaniment part to be combined with the melody part, and wherein said composition means selects, from said storage means, accompaniment data representative of the accompaniment part fitting to the melody part based on the style information and the inputted chord information, and merges the selected accompaniment data with the score data stored in said storage means.

3. A portable telephone apparatus according to claim 1, wherein said composition means reads and edits the music data created and stored in said storage means.

4. A portable telephone apparatus according to claiam 1, wherein said composition means provides said reproduction means with the accompaniment data selected based on the inputted style information or with the created music data so that the user can listen to the accompaniment part or the composed piece of music before making a choice of the piece of music.

5. A portable telephone apparatus having a composition capability, comprising:

a communication means for receiving a call signal to inform a user of an arrival of a call so that the user can start a conversation;

a reproduction means for processing music data in response to the call signal to reproduce a piece of music composed of two or more parts including a melody part and an accompaniment part so as to audibly notify the user of the arrival of the call;

a storage means in whcih accompaniment data representative of two or more different kinds of accompaniment parts are stored;

an input means for inputting score data representative of a desired melody part and for storing the inputted score data into said storage means while inputting style information and specifying a style of an accompaniment part to be combined with the melody part;

a composition means for selecting, from said storage means, accompaniment data represenative of an accompaniment part fitting to the melody part based on the inputted style information, merging the selected accompaniment data with the score data stored in said storage means to creat music data representative of a composed piece of music in two or more parts, and storing the created music data into said storage means; and a control means for reading the music data stored in said storage means in response to the call signal to provide the read music data to said reproduction means so that the composed piece of music can be reproduced, wherein said storage means stores preset music data, music data downloaded through said communiction means, and music data created by said composition means, said input means specifies a piece of music to be reproduced in response to the call signal, and said control means reads music data corresponding to the specified piece of music from among all the music data including the preset music data stored in said storage means, the downloaded music data and the composed music data, and provides the read music data to said reproduction means.

6. A portable telephone apparatus according to claim 5, wherein said composition means reads and edits the music data created and stored in said storage means.

7. A portable telephone apparatus according to claim 5, wherein said composition means provides said reproduction means with the accompaniment data selected based on the inputted style information or with the created music data so that the user can listen to the accompaniment part or the composed piece of music before making a choice of the piece of music.

8. A portable telephone apparatus having a composition capability, comprising:

a communication means for receiving a call signal to inform a user of an arrival of a call so that the user can start a conversation;

a reproduction means for processing music data in response to the call signal to reproduce a piece of music composed of two or more parts including a melody part and an accompaniment part so as to audibly notify the user of the arrival of the call;

a storage means in which accompaniment data representative of tow or more different kinds of accompaniment parts are stored, wherein said storage means store preset accompaniment data and accompaniment data downloaded through said communication means;

an input means for inputting score data representative of a desired melody part and for storing the inputted score data into said storage means while inputting music mood information for specifying a music mood of an accompaniment part to be combined with the melody part;

a composition means for analyzing the score data and operating based on the music mood information for selecting, form said storage means, accompaniment data representative of the accompaniment part fitting to the melody part, then merging the selected accompaniment data with the score data stored in said storage means to create music data representative of a composed piece of music in two or more parts, and storing the created music data into said storage means, wherein said composition means selects, from among all the accompaniment data including the preset accompaniment data and the downloaded accompaniment data, accompaniment data representative of the accompaniment part fitting to the melody part; and a control means for reading the music data stored in said storage means in response to the call signal to provide the read music data to said reproduction means so that the composed piece of music can be reproduced.

9. A portable telephone apparatus having a composition capability, comprising:

a communication means for receiving a call signal to inform a user of an arrival of a call so that the user can start a conversation;

a reproduction means for processing music data in response to the call signal to reproduce a piece of music composed of two or more parts including a melody part and an accompaniment part so as to audibly notify the user of the arrival of the call;

a storage means in which accompaniment data representative of two or more different kinds of accompaniment parts are stored;

an input means for inputting score data representative of a desired melody part and for storing the inputted score data into said storage means while inputting music mood information for specifying a music mood of an accompaniment part to be combined with the melody part;

a composition means for analyzing the score data and operating based on the music mood information for selecting, from said storage means, accompaniment data representative of the accompaniment part fitting to the melody part, then merging the selected accompaniment data with the score data stored in said storage means to creat music data representative of a composed piece of music in two or more parts, and storing the created music data into said storage means; and a control means for reading the music data stored in said storage means in reponse to the call signal to provide the read music data to said reproduction means so that the composed piece of music can be reproduced, wherein said storage means stores preset music data, music data downloaded through said communication means, and music data created by said composition means, said input means specifies a piece of music to be reproduced in response to the call signal, and said control means reads music data corresponding to the specified piece of music from among all the music data including the preset music data stored in said storage means, the downloaded music data and the created music data and providing the read music data to said reproduction means.

10. A portable telephone apparatus according to claim 9, wherein said composition means reads and edits the music data created and stored in said storage means.

11. A portable telephone apparatus according to claim 9, wherein said composition means provides said reproduction means with the accompaniment data selected based on the inputted music mood information or the created music data so that the user can listen to the accompaniment part or the composed piece of music before making a choice of a piece of music.

12. A portable telephone apparatus according to claim 8, wherein said composition means reads and edits the music data created and stored in said storage means.

13. A portable telephone apparatus according to claim 8, wherein said composition means provides said reproduction means with the accompaniment data selected based on the inputted music mood information or the created music data so that the user can listen to the accompaniment part or the composed piece of music before making a choice of a piece of music.

14. A method of composing music in a portable telephone, which is provided with a communication unit for receiving a call signal to inform a user of an arrival of a call so that the user can start a conversation, and a reproduction unit for processing music data in response to the call signal to reproduce a piece of music composed of two or more parts including a melody part and an accompaniment part so as to audibly notify the user of the arrival of the call, said method comprising:

storing in a storage unit accompaniment data representative of two or more different kinds of accompaniment parts, wherein said storage unit stores preset accompaniment data and accompaniment data downloaded through said communication unit;

inputting score data representative of a desired melody part and storing the inputted score data into the storage unit while inputting style information for specifying a style of an accompaniment part to be combined with the melody part;

selecting, from among all the accompaniment data including the preset accompaniment data and downloaded accompaniment data stored in the storage unit, accompaniment data representative of the accompaniment part fitting to the melody part based on the inputted style information, merging the selected accompaniment data with the score data stored in the storage unit to create music data representative of a composed piece of music in two or more parts, and storing the created music data into the storage unit; and reading the music data stored in the storage unit in response to the call signal to provide the read music data to the reproduction unit so that the composed piece of music can be reproduced.

15. A method of composing music in a portable telephone, which is provided with a communication unit for receiving a call signal to inform a user of an arrival of a call so that the user can start a conversation, and a reproduction unit for processing music data in response to the call signal to reproduce a piece of music composed of two or more parts including a melody part and an accompaniment part so as to audibly notify the user of the arrival of the call, said method comprising:

storing in a storage unit accompaniment data representative of two or more different kinds of accompaniment parts, wherein said storage unit stores preset accompaniment data and accompaniment data downloaded through said communication unit;

inputting score data representative of a desired melody part and storing the inputted score data into the storage unit while inputting music mood information for specifying a music mood of an accompaniment part to be combined with the melody part;

analyzing the score data and operating based on the music mood information for selecting, from among all the accompaniment data including the preset accompaniment data and downloaded accompaniment data stored in the storage unit, accompaniment data representative of the accompaniment part fitting to the melody part, then merging the selected accompaniment data with the score data stored in the storage unit to create music data representative of a composed piece of music in two or more parts, and storing the created music data into the storage unit; and reading the music data stored in the storage unit in response to the call signal so as to provide the read music data to the reproduction unit so that the the composed piece of music can be reproduced.

16. A computer readable medium having encoded thereon a music composition program installable in a portable telephone, the portable telephone being provided with a communication unit for receiving a call signal to inform a user of an arrival of a call so that the user can start a conversation, a reproduction unit for processing music data in response to the call signal to reproduce a piece of music composed of two or more parts including a melody part and an accompaniment part so as to audibly notify the user of the arrival of the call, and a CPU for controlling the communication unit and the reproduction unit, the music composition program including instruction which when executed cause:

storing in a storage unit accompaniment data representative of two or more different kinds of accompaniment parts, wherein said storage unit stores preset accompaniment data and accompaniment data downloaded through said communication unit;

inputting score data representative of a desired melody part and storing the inputted score data into the storage unit while inputting style information for specifying a style of an accompaniment part to be combined with the melody part;

selecting, from among all the accompaniment data including the preset accompaniment data and downloaded accompaniment data stored in the storage unit, accompaniment data representative of the accompaniment part fitting to the melody part based on the inputted style information, then merging the selected accompaniment data with the score data stored in the storage unit to create music data representative of a composed piece of music in two or more parts, and storing the created music data into the storage unit; and reading the music data stored in the storage unit in response to the call signal so as to provide the read music data to the reproduction unit so that the composed piece of music can be reproduced.

17. A computer readable medium, having encoded thereon a music composition program, and being installable in a portable telephone, the portable telephone being provided with a communication unit for receiving a call signal to inform a user of an arrival of a call so that the user can start a conversation, a reproduction unit for processing music data in response to the call signal so as to reproduce a piece of music composed of two or more parts including a melody part and an accompaniment part so as to audibly notify the user of the arrival of the call, and a CPU for controlling the communication unit and the reproduction unit, the music composition program including instruction which when executed casue:

storing in a storage unit accompaniment data representative of two or more different kinds of accompaniment parts, wherein said storage unit stores preset accompaniment data and accompaniment data downloaded through said communication unit;

inputting score data representative of a desired melody part and storing the inputted score data into the storage unit while inputting music mood information for specifying a music mood of an accompaniment part to be combined with the melody part;

analyzing the score data and operating based on the music mood information for selecting, from among all the accompaniment data including the preset accompaniment data and downloaded accompaniment data stored in the storage unit, accompaniment data representative of the accompaniment part fitting to the melody part, then merging the selected accompaniment data with the score data stored in the storage unit to create music data representative of a composed piece of music in two or more parts, and storing the created music data into the storage unit; and reading the music data stored in the storage unit in response to the call signal and providing the read music data to the reproduction unit so that the composed piece of music can be reproduced.

18. A portable telephone aparatus according to claim 5, wherein said input means inputs, in addition to the style information, chord information for specifying a progression of chords in the accompaniment part to be combined with the melody part, and wherein said composition means selects, from said means, accompaniment data representative of the accompaniment part fitting to the melody part based on the style information and the inputted chord information, and merges the selected accompaniment data with the score data stored in said storage means.

19. A method of composing music in a portable telephone, which includes a communication unit for receiving a call signal to inform a user of an arrival of a call so that the user can start aconversation, and a reproduction unit for processing music data in response to the call signal to reproduce a piece of music composed of two or more parts including a melody part and an accompaniment part so as to audibly notify the user of the arrival of the call, said method comprising:

storing in a storage unit accompaniment data representative of two or more different kinds of accompaniment parts;

inputting via an input unit score data representative of a desired melody part and storing the inputted score data into the storage unit while inputting style information for specifying a style of an accompaniment part to be combined with the melody part;

selecting, from the storage unit, accompaniment data representative of the accompaniment part fitting to the melody part based on the inputted style information, merging the selected accompaniment data with the score data stored in the storage unit to create music data representative of a composed piece of music in two or more parts, and storing the created music data into the storage unit; and reading, by a control unit, the music data stored in the storage unit in response to the call signal to provide the read music data to the reproduction unit so that the composed piece of music can be reproduced, wherein said storage unit stores preset music data, music data downloaded through said communication unit, and music data created by a composition unit, said input unit specifies a piece of music to be reproduced in response to the call signal, and said control unit reads music data corresponding to the specified piece of music to be reproduced from among all the music data including the preset music data stored in said storage unit, the downloaded music data the composed music data, and provides the read music data to said reproduction unit.

20. A computer readable medium having encoding thereon a music composition program installable in a portable telephone, the portable telephone including a communication unit for receiving a call signal to inform a user of an arrival of a call so that the user can start a conversation, a reproduction unit for processing music data in respone to the call signal so as to reproduce a piece of music composed of two or more parts including a melody part and an accompaniment part so as to audibly notify the user of the arrival of the call, and a CPU for controlling the communication unit and the reproduction unit, the music composition program including instruction which when executed cause:

storing in a storage unit accompaniment data representative of two or more different kinds of accompaniment parts;

inputting via an input unit, score data representative of a desired melody part and storing the inputted score data into the storage unit while inputting style information for specifying a style of an accompaniment part to be combined with the melody part;

selecting, from the storage unit, accompaniment data representative of the accompaniment part fitting to the melody part based on the inputted style information, merging the selected accompaniment data with the score data stored in the storage unit to create music data representative of a composed piece of music in two or more parts, and storing the created music data into the storage unit; and reading, by a control unit, the music data stored in the storage unit in response to the call signal to provide the read music data to the reproduction unit so that the composed piece of music can be reproduced, wherein said storage unit stores preset music data, music data downloaded through said communication unit, and music data created by a composition unit, said input specifies a piece of music to be reproduced in response to the call signal, and said control unit reads music data corresponding to the specified piece of music to be reproduced from among all the music data including the preset music data stored in said storage unit, the downloaded music data the composed music data, and provides the read music data to said reproduction unit.

21. A method of composing music in a portable telephone, which includes a communication unit for receiving a call signal to inform a user of an arrival of a call so that the user can start a conversation, and a reproduction unit for processing music data in response to the call signal to reproduce a piece of music composed of two or more parts including a melody part and an accompaniment part so as to audibly notify the user of the arrival of the call, said method comprising:

storing in a storage unit accompaniment data representative of two or more different kinds of accompaniment parts;

inputting, via an input unit, score data representative of a desired melody part and for storing the inputted score data into said storage means while inputting music mood information for specifying a music mood of an accompaniment part to be combined with the melody part;

analyzing the score data and operating based on the music mood information for selecting, from said storage unit, accompaniment data representative of the accompaniment part fitting to the melody part, then merging the selected accompaniment data with the score data stored in said storage unit to create music data representative of a composed piece of music in two or more parts, and storing the created music data into said storage unit; and reading, by a control unit, music data stored in said storage unit in response to the call signal to provide that read music data to said reproduction unit so that the composed piece of music can be reproduced, wherein said storage unit stores preset music data downloaded through said communication unit, and music data created by said composition unit, said input unit specifies a piece of music to be reproduced in response to the call signal, and said control unit reads music data corresponding to the specified piece of music from among all the music data including the preset music data stored in said storage unit, the downloaded music data and the created music data and providing the read music data to said reproduction unit.

22. A computer readable medium having encoded thereon a music composition program installable in a portable telephone, the protable telephone including a communication unit for receiving a call signal to inform a user of an arrival of a call so that the user can start a conversation, a reproduction unit for processing music data in response to the call signal so as to reproduce a piece of music composed of two or more parts including a melody part and an accompaniment part so as to audibly notify the user of the arrival of the call, and a CPU for controlling the communication unit and the reproduction unit, the music composition program including instruction which when executed cause:

storing in a storage unit accompaniment data representative of two or more different kinds of accompaniment parts;

inputting, via an input unit, score data representative of a desired melody part and for storing the inputted score data into said storage means while inputting music mood information for specifying a music mood of an accompaniment part to be combined with the melody part;

analyzing the score data and operating based on the music mood information for selecting, from said storage unit, accompaniment data representative of the accompaniment part fitting to the melody part, then merging the selected accompaniment data with the score data stored in said storage unit to create music data representative of a composed piece of music in two or more parts, and storing the creating music data into said storage unit; and reading, by a control unit, music data stored in said storage unit in response to the call signal to provide the read music data to said reproduction unit so that the composed piece of music can be reproduced, wherein said storage unit stores preset music data, music data downloaded through said communication unit, and music data created by said composition unit, said input unit specifies a piece of music to be reproduced in response to the call signal, and said control unit reads music data corresponding to the specified piece of music from among all the music data including the preset music data stored in said storage unit, the downloaded music data and the created music data and providing the read music data to said reproduction unit.

* * * * *